United States Patent
Sitarski et al.

(10) Patent No.: US 9,114,722 B2
(45) Date of Patent: Aug. 25, 2015

(54) SYSTEM AND METHOD FOR CALCULATING AND DISPLAYING AVERAGE AUXILIARY POWER IN A VEHICLE

(75) Inventors: Nicholas Scott Sitarski, Ypsilanti, MI (US); Daniel Todd Smith, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 943 days.

(21) Appl. No.: 13/301,858

(22) Filed: Nov. 22, 2011

(65) Prior Publication Data

US 2013/0127475 A1    May 23, 2013

(51) Int. Cl.
*G01R 31/36* (2006.01)
*B60L 11/18* (2006.01)
*H02J 7/00* (2006.01)

(52) U.S. Cl.
CPC ......... *B60L 11/1861* (2013.01); *B60L 11/1868* (2013.01); *B60L 2250/16* (2013.01); *H02J 2007/005* (2013.01); *Y02T 10/7005* (2013.01); *Y02T 10/7044* (2013.01); *Y02T 10/7066* (2013.01)

(58) Field of Classification Search
CPC ............... G01R 31/36; G01R 31/3606; G01R 31/3631; G01R 31/362401; G01R 31/3662
See application file for complete search history.

(56) References Cited

U.S. PATENT DOCUMENTS

| | | | |
|---|---|---|---|
| 7,330,105 B2 | 2/2008 | Chew et al. | |
| 2007/0029121 A1 | 2/2007 | Saitou et al. | |
| 2008/0178032 A1 | 7/2008 | Walrath | |
| 2013/0096749 A1* | 4/2013 | Hussain et al. | 701/22 |

* cited by examiner

*Primary Examiner* — Michita Henson
(74) *Attorney, Agent, or Firm* — Gifford, Krass, Sprinkle, Anderson & Citkowski, P.C.

(57) ABSTRACT

A system and method for calculating and displaying average auxiliary power use in a vehicle is provided. The vehicle includes an auxiliary battery for powering auxiliary electrical devices, an auxiliary battery controller, a display for displaying both instantaneous and average auxiliary power consumption, and an electric motor. A main battery powers the electric motor. The auxiliary battery is connected to the main battery via a DC/DC converter. A sensor detects instantaneous auxiliary power usage from each of the auxiliary loads. The vehicle includes a combination meter configured to calculate an average auxiliary power usage amount based on the plurality of instantaneous auxiliary usage amounts. A display operable to display the average auxiliary power usage amount over the predetermined period of time and display each instantaneous auxiliary power usage amount.

13 Claims, 4 Drawing Sheets

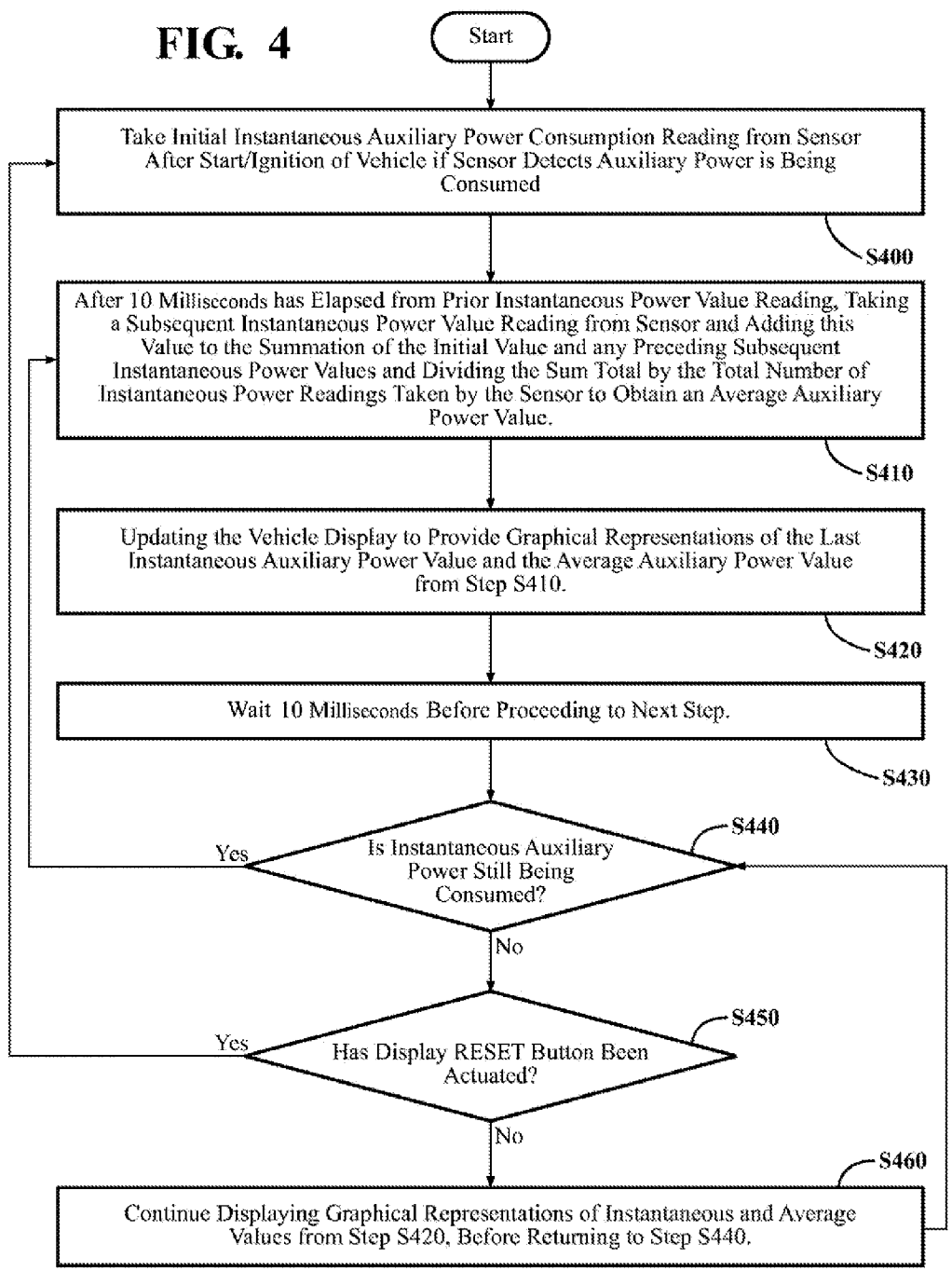

SYSTEM AND METHOD FOR CALCULATING AND DISPLAYING AVERAGE AUXILIARY POWER IN A VEHICLE

FIELD OF THE INVENTION

The present invention relates to a system and method for calculating and displaying average auxiliary power in a vehicle having a battery dedicating to powering an electric traction motor and a battery dedicated to powering auxiliary systems. The system is operable to measure the instantaneous power consumption of auxiliary systems at the auxiliary battery at predetermined intervals and process these measurements to display both an instantaneous power reading and an average power measurement on a vehicle display system. While instantaneous power readings may show very large transient response in auxiliary system power consumption, displaying an average auxiliary power value gives the driver a better understanding of how average auxiliary power is being consumed.

BACKGROUND OF THE INVENTION

Electric vehicles (EVs) and hybrid electric vehicles (HEVs) powered by electric motors are currently known. In EVs, an electric traction motor is powered by a battery, while an HEV may employ both an internal combustion engine and an electric traction motor to drive the vehicle. Power produced by both internal combustion engines and electric traction motors is transferred to a transmission, which in turn drives the wheels via a driveshaft and differentials.

EVs and HEVs may have multiple batteries dedicated to powering defined systems. Presently, EVs and HEVs may have one or more main batteries dedicated to providing power to the vehicle powertrain with one or more auxiliary batteries dedicated to providing power the vehicle's navigation system, radio, and other multimedia devices, exterior vehicle lighting, interior vehicle lighting, power steering, power windows, power locks, wiper systems, defroster systems, comfort systems like heated seats and steering wheels and the HVAC system. Operating one or more auxiliary devices may draw power from the battery systems which can overall affect the range of the EV or HEV.

Currently, EVs/HEVs have systems showing the charge level of batteries, but charge only shows the amount of current transferred over a period of time and is not a good indicator of power consumption of vehicle systems. Additionally, EVs/HEVs have systems showing the instantaneous power consumption of vehicle batteries, but such displays may be misleading and confuse the vehicle operator. Typically, instantaneous power displays provide a visual of instantaneous power which only shows power consumption for the instant time period. Due to transient power spikes when some vehicle systems are actuated (i.e. the blower motor for the HVAC system, condenser, etc.) it may appear to the vehicle operator that the vehicle is consuming more power than it is consuming over the long term. Thus, EV/HEV operators cannot currently ascertain the power consumption of electric vehicle systems and how the interoperability of electric systems affect the power availability to the vehicle as a whole. The overall driving range of an EV/HEV, because of system integration, is affected by the power consumption of all electrical systems in a vehicle. Accordingly, there is a need to develop an easily understandable display that informs the vehicle operator of the power being consumed by auxiliary systems. Thus, it is desirable to have a system and method for calculating the average auxiliary power used in a vehicle, so as to allow a vehicle operator to make better power management decisions.

SUMMARY OF THE INVENTION

The present invention provides a system and method for calculating and displaying the average power consumption of auxiliary vehicle systems. The vehicle includes one or more main batteries dedicated to powering an electric traction motor operable to drive the vehicle and one or more auxiliary batteries used to power auxiliary systems.

Each battery system may be controlled by an individual electronic control unit (ECU) intended to provide control to a battery system. The ECU contains a processor operable to manage battery resources among a variety of different vehicle systems. While the auxiliary battery/batteries is/are primarily used for auxiliary systems, the main battery/batteries may be interconnected to the auxiliary battery via a DC/DC converter.

One or more sensors for measuring the instantaneous power consumption of auxiliary systems is/are operably connected to the one or more auxiliary batteries to measure instantaneous auxiliary power consumption data at predetermined intervals. This data may also be obtained from the auxiliary battery system ECU. Due to the variability of instantaneous power consumption caused by the transient response of turning on an auxiliary device, displaying a measure of instantaneous power may confuse the vehicle operator as to the real and long-term power usage of the auxiliary devices, because the instantaneous power may change frequently based on the types of auxiliary devices being used.

The system further includes a first processor in communication with the sensor. The first processor is operable to store the instantaneous power consumption data on a first memory device and process the stored instantaneous auxiliary power consumption data to output an average auxiliary power consumption value based on instantaneous auxiliary power consumption data from the sensor.

The first processor in communication with auxiliary battery sensor may further include an application that when executed, may further process the instantaneous power consumption data to identify and associate the one or more auxiliary devices generating the instantaneous power consumption data.

The first processor may further include a second memory device or database operable to store a larger amount of instantaneous auxiliary power consumption data so that the first processor and/or application may process the stored data from the second memory device to calculate and display historical auxiliary power consumptions trends over longer periods of time.

The system further includes a display or another visual indicator operable to display both the instantaneous auxiliary power consumption and also the average auxiliary power consumption value calculated by the first processor. Accordingly, displaying the average power consumption of auxiliary power systems to the vehicle operator provides the operator with a better indication of how the auxiliary devices contribute to the overall power consumption in an EV/HEV.

The system may further include one or more buttons located on or near the display that when actuated, may clear the average power consumption value on the display. Actuating a button may also switch the display from showing both instantaneous and average power consumption to displaying other data.

A method for calculating average auxiliary power consumption is also provided. The method includes the step of measuring instantaneous auxiliary power consumption at a predetermined interval at either the one or more auxiliary batteries or the auxiliary battery ECU to obtain instantaneous auxiliary power data. The method may further include the steps of transferring the obtained instantaneous auxiliary battery power data from the sensor to a processor in the combination meter for processing. The method may further include the steps of continually processing the instantaneous auxiliary power consumption data to average the instantaneous auxiliary power consumption data to obtain an average auxiliary power consumption value. The method may further include the steps of outputting both the instantaneous power consumption value and the average auxiliary power consumption to a visual display. The method may further include the steps of updating both the displayed instantaneous and average values as new instantaneous sensor data becomes available at each predetermined interval. Thus, the method provides a relatively simple way of calculating and displaying both average and instantaneous auxiliary power consumption to the vehicle operator, to better show how electric power is being consumed in the electric vehicle.

BRIEF DESCRIPTION OF THE DRAWINGS

FIG. 4 is a diagram showing a method for managing power in a vehicle.

DETAILED DESCRIPTION OF THE INVENTION

Figure 1:
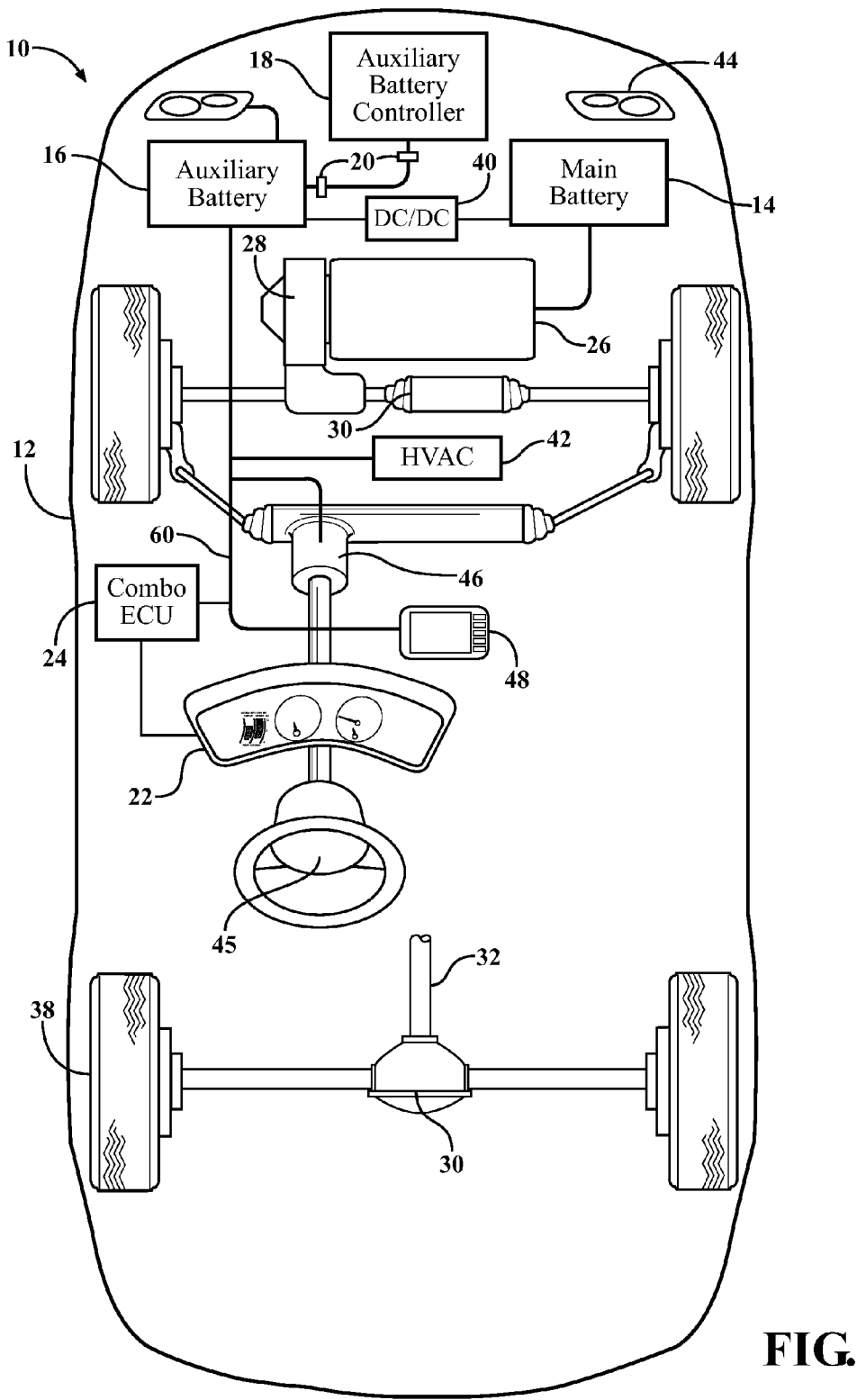
FIG. 1 is a system diagram for a system calculating and displaying average auxiliary power consumption.
Figure 2:
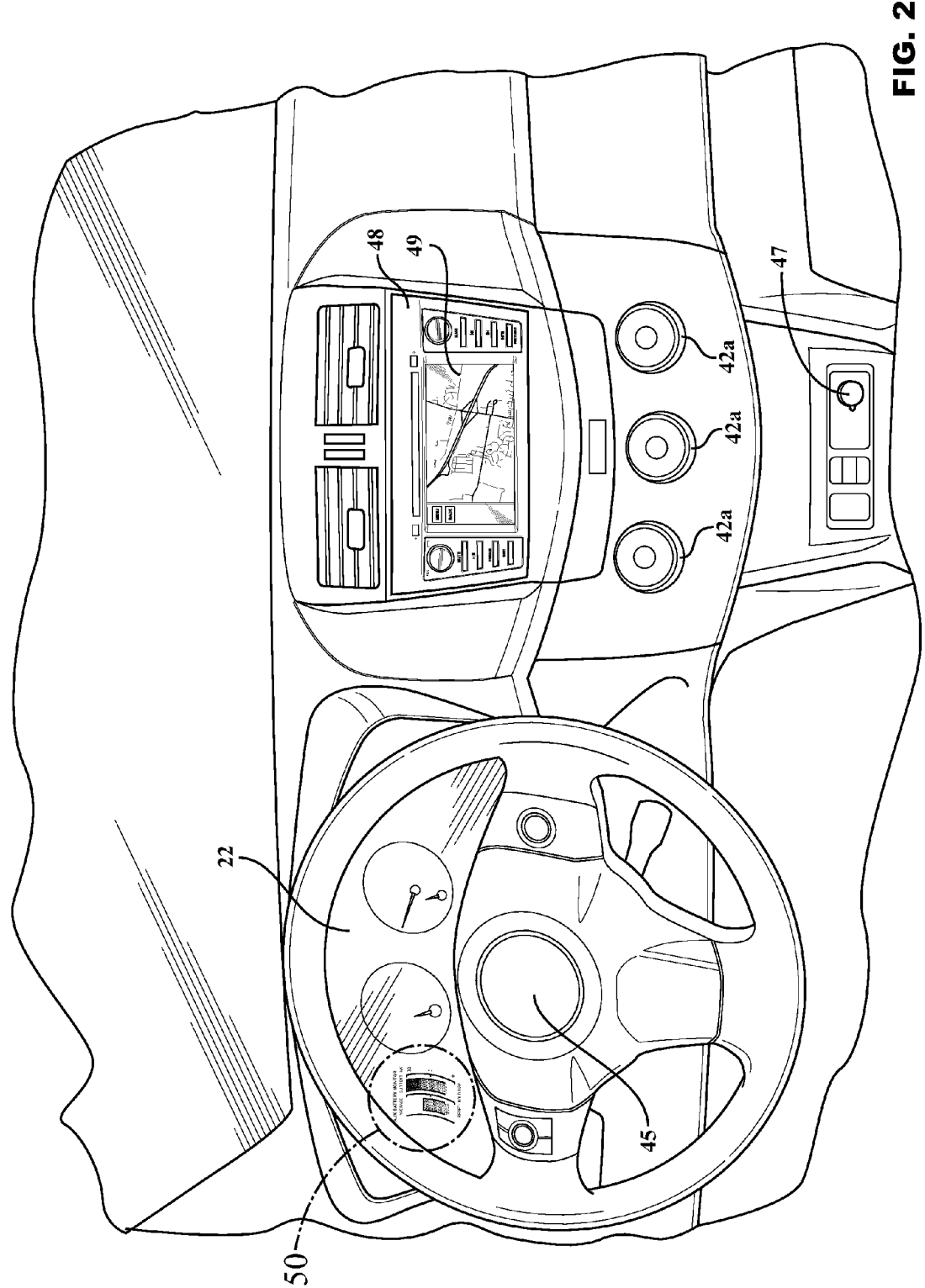
FIG. 2 is a perspective view of a display for use in the system shown in FIG. 1.

Looking at FIGS. 1 and 2, a system shown generally at 10, for calculating and displaying average auxiliary power consumption in a EV/HEV vehicle 12 is provided. Vehicle 12 may contain one or more main batteries 14 dedicated to powering an electric traction motor 26 which converts the electrical energy of the battery 14 into mechanical energy. The mechanical energy output by the motor 26 is used by other powertrain systems such as the transmission 28, differential 30, and driveshaft 32 to transfer energy to the wheels 38 to drive the vehicle 12.

The main battery 14 also provides power to the DC/DC converter 40, battery coolant heater (not shown) and cabin coolant heater (part of HVAC system 42).

The main battery 14 is preferably of a Lithium ion chemistry and may provide up to approximately 40 kWh of power. However, the main battery 14 need not be limited to these characteristics and may be any other batteries used to power electric vehicles.

In addition to main battery 14, vehicle 12 may also contain one or more auxiliary batteries 16 for powering auxiliary devices/loads in the vehicle. The auxiliary battery 16 is preferably of a lead acid chemistry and may provide approximately 0.4 kWh of power, though the auxiliary battery need not be limited to these parameters and characteristics, as auxiliary batteries of the like may be used. Energy from each battery 14, 16 may be used for powering auxiliary devices. The auxiliary battery 16 is used for vehicle startup and as a buffer for main battery 14. Main battery 14 and auxiliary battery 16 are connected via a DC/DC converter 40.

The system 10 includes a sensor 20 for detecting instantaneous auxiliary power consumption. The sensor may be operatively attached to either the auxiliary battery 16 itself or the auxiliary battery controller 18. The sensor 20 senses instantaneous auxiliary power consumption from a plurality of auxiliary batteries devices/loads. The auxiliary devices may include, but are not limited to: all vehicle ECUs, such as the auxiliary battery controller 18 and the like, all vehicle sensors, such as the instantaneous power consumption sensor 20 and the like; interior and exterior lighting, such as headlamps 44; HVAC system 42; power steering 46; multimedia and navigation devices such as 48, actuators such as door locks (not shown) and the like; horns 45; displays such as an electronic instrument cluster 22 and navigation display 49, as well as additional vehicle electrical devices such as 12 VDC plug 47.

A vehicle operator may observe how auxiliary power is being consumed by auxiliary vehicle devices/loads in vehicle 12 by observing instantaneous and average auxiliary power display 50. By turning on and off or adjusting power to auxiliary devices/loads, the vehicle operator may observe large spikes and drops on the instantaneous auxiliary power display 52 and the overall effect of auxiliary power consumption on the average auxiliary power display 54. For example, the vehicle operator may adjust the HVAC system 42 blower fan (not shown) to a lower level thereby reducing the power consumption of HVAC system 42. In doing such, the instantaneous auxiliary consumption meter may show an initial drop in power consumption, while over the long term, the average auxiliary power consumption slowly decreases as well. Alternatively, a vehicle operator may increase the power consumption of auxiliary electrical devices/loads. For example, the vehicle operator may increase the fan blower of HVAC system 42 and may actuate the HVAC system 42 air conditioning which requires additional power for operation of a condenser/cooling device (not shown). Thus, instantaneous auxiliary power consumption display 52 may show a large spike upon actuation of the HVAC controls 42a to select a higher fan blower speed or air conditioning which requires use of a condenser to chill the air. Accordingly, the average auxiliary power consumption display 54 may slowly rise over the long term. Thus, the vehicle operator may adjust auxiliary vehicle devices/loads accordingly to reduce auxiliary power consumption and overall vehicle power consumption which in turn may provide more available overall power for vehicle 12 propulsion from traction motor 26. Display 50 provides the vehicle operator of auxiliary power usage so as to facilitate better auxiliary power consumption management.

System 10 may include a processor in either of the combination meter controller 24 or at the auxiliary battery controller 18. The processor in either the combination meter controller 24 or auxiliary battery controller 18 may process data from the instantaneous auxiliary power consumption sensor 20 to store and process instantaneous auxiliary power readings and to process, store and provide an average auxiliary power consumption calculation.

Figure 3:
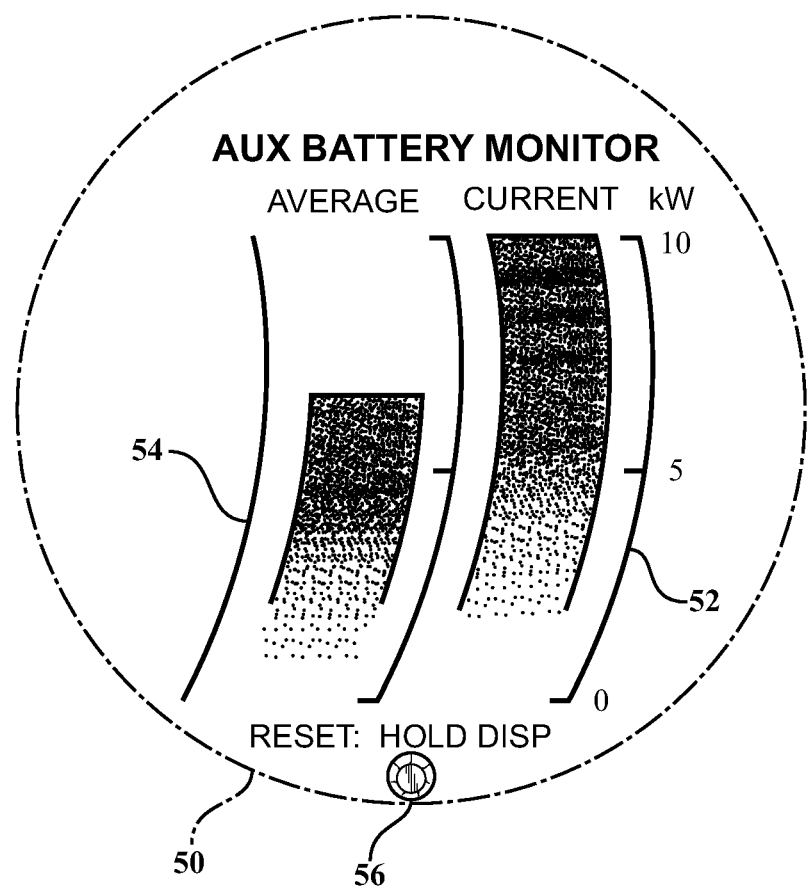
FIG. 3 is an exploded view of the system display.

Referring now to FIG. 3, the average auxiliary power consumption calculation is sent from the processor of either combination meter controller 24 or auxiliary battery controller 18 to display 50, whereby both instantaneous and average auxiliary power consumption data can be displayed visibly to a vehicle operator on instantaneous auxiliary power consumption display 52 and/or average auxiliary power consumption display 54. Preferably, both display 52 and 54 are adjacent to each other to provide the vehicle operator with both short term and long term vehicle auxiliary power consumption trends. However, the instantaneous auxiliary power consumption 52 and average auxiliary power consumption 54 displays need not be adjacent. By providing both displays 52 and 54 a vehicle operator can see how spikes in auxiliary power consumption affect the overall, long-term auxiliary power consumption of the vehicle, whereby the vehicle operator may make better use and better manage vehicle auxiliary power, which in turn, may provide more or less power for vehicle 12 propulsion.

The processor of controller 18 or 22 may also include a memory (not shown) whereby both instantaneous and average auxiliary power consumption data may be stored. Stored data may provide the vehicle operator, vehicle technician and the like with historical data to give a better understanding of how vehicle power is being consumed, power consumption trends, and power consumption diagnostics and may help the operator and/or technician to modify auxiliary power consumption trends based on the historical data. The average auxiliary power consumption display 54 on auxiliary power consumption display 50 may be reset by actuating button 56 to clear stored average auxiliary power consumption data. Preferably the memory may be partitioned to retain total vehicle average auxiliary power consumption data, while clearing average auxiliary power consumption data output to the display.

The auxiliary power consumption data need not be represented by an electrical display 50 as shown in FIGS. 2 and 3, but may be substituted for analog gauges or the like. The display 50 need not be limited to only showing average auxiliary power consumption 54 and instantaneous power consumption 52, but may also include indicators to the vehicle operator to show how auxiliary power is being consumed. Such indicators may include, but are not limited to a snowflake to represent the HVAC cooling system 42 is consuming power, a music note to represent the radio function of multimedia unit 48, or a light bulb to represent power consumption by headlamps 44. The display may be further operable to display instantaneous and auxiliary power consumption based on auxiliary power consumption by each individual device/load rather than by total vehicle auxiliary power consumption.

The interconnectivity of the system may be achieved by utilizing the vehicle wiring harness, CAN bus, or other vehicle wiring system/communication system indicated at 60.

With reference now to FIG. 4, a flowchart showing a method for calculating and displaying instantaneous and average auxiliary power consumption in vehicle 12 is provided. Vehicle 12 includes on or more main and auxiliary batteries, an electric motor, and a plurality of auxiliary devices/loads. Auxiliary devices may include, but are not limited to: all vehicle ECUs, all vehicle sensors; interior and exterior lighting, such as headlamps 44; HVAC system 42; power steering 46; multimedia and navigation devices 48, actuators such as door locks (not shown) and the like; horns 45; displays such as an electronic instrument cluster 22 and navigation display 49, as well as additional vehicle electrical devices and systems such as 12 VDC plug 47. The auxiliary devices may be powered by both the main battery 14 and auxiliary battery 16. The method includes the steps of accumulating an initial auxiliary power consumption reading after the sensor 20 detects auxiliary power is being consumed by an auxiliary device/load represented at step S400 and processing initial and subsequent instantaneous power readings in the processor of either controller 18 or 24 to calculate and store both instantaneous auxiliary power consumption and average power consumption as shown at S400.

The method further includes the steps of taking a subsequent instantaneous power reading at a predetermined interval after the initial instantaneous auxiliary power reading, with additional subsequent instantaneous power readings taken at predetermined intervals thereafter. Preferably, the predetermined interval is 10 milliseconds, however, the interval need not be this exact interval and other intervals may be used. The subsequent instantaneous auxiliary power consumption readings are added to the initial instantaneous power consumption reading after the sensor acquires each subsequent instantaneous power reading, and the sum of the initial and all subsequent power reading values thereafter is divided by the total number of sensor readings to obtain an average auxiliary power consumption value at step S410.

The method further includes updating the display 50 to show the last instantaneous auxiliary power consumption reading from sensor 20 to display an instantaneous auxiliary power consumption display 52 and display the last average power consumption data calculated by the processor of controller 18 or 24 shown at step S420

The method further includes updating the data in the processor of controller 18 or 24 at regular, predetermined intervals step S430, and thereafter updating displays 50, 52, and 54 accordingly shown at step S420.

The method further continues step S460 until power consumption is either stopped in the vehicle step S440 or the Reset button 56 on display 50 has been depressed at step S450.

Thus, the method provides a relatively simple way for the vehicle operator to observe and manage power consumption of auxiliary devices/loads in vehicle 12.

While the aforementioned method is the preferred embodiment of calculating and displaying the average auxiliary power usage in a vehicle, it is in no way limiting. Other calculations and algorithms known in the art to provide an average auxiliary power consumption value or an approximate average auxiliary consumption value may be used.

Although a presentation of the preferred embodiment(s) has been described, it is for illustrative purposes only. The words used herein are descriptive rather than of limitative form.

We claim:

1. A system for measuring average auxiliary power in a vehicle, the vehicle having a main battery, an auxiliary battery, an electric motor, and a plurality of electrical loads connected to the auxiliary battery, the auxiliary battery operable to power the plurality of electrical loads, the system comprising:
   a sensor operable to detect a plurality of instantaneous auxiliary power usage amounts from the plurality of electrical loads;
   an auxiliary battery electrical control unit configured to receive information from the sensor and to process information from the sensor so as to calculate the amount of instantaneous power used by the plurality of electrical loads connected to auxiliary over a predetermined period of time;
   a combination meter in communication with the sensor, the combination meter operable to calculate an average auxiliary power usage amount based on the plurality of instantaneous auxiliary usage amounts; and
   a display operable to display the average auxiliary power usage amount over the predetermined period of time and display each instantaneous auxiliary power usage amount.

2. The system of claim 1, wherein the sensor is part of the auxiliary battery electrical control unit.

3. The system of claim 2, wherein the display is part of the combination meter.

4. The system of claim 3, wherein the display of average auxiliary power usage amount over the predetermined period of time and display of the instantaneous auxiliary usage amount are generated by the combination meter.

5. The system of claim 2, wherein the display is part of another vehicle display system.

6. The system of claim 2, wherein the predetermined amount of time is at least 10 milliseconds.

7. The system of claim 2, wherein the auxiliary battery electrical control unit is in communication with the combination meter via a communication line.

8. The system of claim 7, wherein the communication line is a controlled-area network (CAN)-bus.

9. The system of claim 1, wherein the display of auxiliary power usage amount and the display of instantaneous auxiliary usage amount are displayed relatively adjacent to one another.

10. The system of claim 1, wherein the display of average auxiliary power usage amount over the predetermined period of time and display of instantaneous auxiliary usage amount are analog gauges.

11. The system of claim 1, wherein average auxiliary power usage amount over a predetermined period of time and instantaneous auxiliary power usage amounts are calculated and displayed in kilowatts (kW).

12. A system for measuring average auxiliary power in a vehicle, the vehicle having one or more main batteries, one or more auxiliary batteries, an electric motor, and a plurality of electrical loads connected to the auxiliary battery, the auxiliary battery operable to power the plurality of electrical loads, the system comprising:
   a sensor operable to detect a plurality of instantaneous auxiliary power usage amounts from the plurality of electrical loads;
   an auxiliary battery electrical control unit configured to receive information from the sensor and to process information from the sensor so as to calculate the amount of instantaneous power used by the plurality of electrical loads connected to auxiliary over a predetermined period of time;
   a combination meter in communication with the sensor via a communication line, the combination meter having a processor operable to calculate an average auxiliary power usage value based on the plurality of instantaneous auxiliary usage amounts; and
   a display operable to display the average auxiliary power usage amount over the predetermined period of time and display each instantaneous auxiliary power usage amount, whereby the display may be reset by actuating a reset button.

13. A method for calculating and displaying an average of auxiliary power usage amount in a vehicle, the vehicle having a main battery, an auxiliary battery operable to power a plurality of electrical loads, an electric motor, the plurality of electrical loads connected to the auxiliary battery, a sensor at the auxiliary battery, and a combination meter operable to process auxiliary battery sensor readings and display average auxiliary power usage over a predetermined period of time and instantaneous auxiliary power consumption, the method comprising the steps of:
   (a) providing an auxiliary battery electrical control unit configured to determine an initial instantaneous auxiliary power consumption reading from the sensor, wherein the instantaneous auxiliary power consumption reading is a total amount of instantaneous power used by the plurality of electrical loads connected to the auxiliary battery measured at a predetermined time;
   (b) sending the initial instantaneous auxiliary power consumption reading and subsequent instantaneous auxiliary power consumption readings to the combination meter to determine an average value;
   (c) after the predetermined time has elapsed, taking a subsequent instantaneous auxiliary power consumption reading from the combination meter and adding the subsequent instantaneous auxiliary power consumption reading to the value of the summation of the initial instantaneous power value and all preceding subsequent instantaneous auxiliary power consumption readings and dividing by a total number of instantaneous auxiliary power readings taken by the sensor to obtain an average auxiliary power reading;
   (d) displaying both the instantaneous auxiliary power usage amount and average auxiliary power usage amount over the predetermined period of time on the combination meter;
   (e) waiting 10 milliseconds before returning to step (c) if the sensor detects that instantaneous power is still being consumed and a reset button on the display has not been actuated.

\* \* \* \* \*

UNITED STATES PATENT AND TRADEMARK OFFICE
CERTIFICATE OF CORRECTION

PATENT NO. : 9,114,722 B2  
APPLICATION NO. : 13/301858  
DATED : August 25, 2015  
INVENTOR(S) : Nicholas Scott Sitarski and Daniel Todd Smith It is certified that error appears in the above-identified patent and that said Letters Patent is hereby corrected as shown below:

Title page, Right Column, Primary Examiner, delete "Michita Henson" and insert --Mischita Henson--, therefor.

Signed and Sealed this  
First Day of March, 2016

Michelle K. Lee  
*Director of the United States Patent and Trademark Office*